(12) United States Patent
Lipman et al.

(10) Patent No.: US 9,389,300 B2
(45) Date of Patent: Jul. 12, 2016

(54) MECHANISM FOR EMPLOYING AND FACILITATING GEODETIC TRIANGULATION FOR DETERMINING GLOBAL POSITIONING OF COMPUTING DEVICES

(75) Inventors: Justin Lipman, Shanghai (CN); Robert A. Colby, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 13/977,687

(22) PCT Filed: Dec. 22, 2011

(86) PCT No.: PCT/US2011/066834
§ 371 (c)(1),
(2), (4) Date: Jun. 29, 2013

(87) PCT Pub. No.: WO2013/095506
PCT Pub. Date: Jun. 27, 2013

(65) Prior Publication Data
US 2013/0288714 A1    Oct. 31, 2013

(51) Int. Cl.
*H04W 24/00* (2009.01)
*G01S 5/02* (2010.01)
*G01S 5/14* (2006.01)
(Continued)

(52) U.S. Cl.
CPC ............ *G01S 5/0205* (2013.01); *G01S 5/0226* (2013.01); *G01S 5/0263* (2013.01); *G01S 5/0284* (2013.01); *G01S 5/14* (2013.01); *G01S 19/00* (2013.01); *H04W 64/00* (2013.01); *H04W 84/12* (2013.01)

(58) Field of Classification Search
CPC ..................................................... H04W 64/00
USPC .................. 455/456.1, 456.5, 456.6; 370/241
See application file for complete search history.

(56) References Cited

U.S. PATENT DOCUMENTS

| 2003/0001776 A1 | 1/2003 | Hannah et al. |
| 2007/0067200 A1 | 3/2007 | Patel |

(Continued)

FOREIGN PATENT DOCUMENTS

| CN | 101129078 | 2/2008 |
| CN | 101742524 | 6/2010 |

(Continued)

OTHER PUBLICATIONS

Taiwan Invention Application No. 101144301, Taiwan IPO Search Report ; Date of completion of search May 20, 2014, 1 pg.

(Continued)

*Primary Examiner* — Chuck Huynh
(74) *Attorney, Agent, or Firm* — Blakely, Sokoloff, Taylor & Zafman LLP (57) ABSTRACT

A mechanism is described for facilitating dynamic client-side triangulation to determine global position of computing devices according to one embodiment of the invention. A method of embodiments of the invention includes detecting, at a computing device, first location information associated with static wireless access points. The method may further include detecting, at the computing device, second location information associated with roaming computing devices broadcasting the second location information relating to their current locations, and dynamically determining a current location of the computing device based on the first and second location information.

13 Claims, 7 Drawing Sheets

(51) Int. Cl.
    *G01S 19/00*     (2010.01)
    *H04W 64/00*     (2009.01)
    *H04W 84/12*     (2009.01)

(56) References Cited

U.S. PATENT DOCUMENTS

| | | | |
|---|---|---|---|
| 2007/0247366 A1* | 10/2007 | Smith et al. | 342/464 |
| 2008/0139114 A1* | 6/2008 | Ranganathan | 455/41.1 |
| 2008/0261615 A1 | 10/2008 | Kalhan | |
| 2009/0077620 A1 | 3/2009 | Ravi et al. | |
| 2009/0280824 A1 | 11/2009 | Rautianinen et al. | |
| 2010/0111033 A1 | 5/2010 | Erceg et al. | |
| 2010/0246405 A1 | 9/2010 | Potkonjak | |
| 2010/0251134 A1 | 9/2010 | Van Seggelen et al. | |
| 2011/0256881 A1 | 10/2011 | Huang et al. | |

FOREIGN PATENT DOCUMENTS

| | | |
|---|---|---|
| JP | 2007-201921 | 8/2007 |
| JP | 2009-524546 | 8/2009 |
| JP | 2010-112869 | 5/2010 |
| TW | 2007/05910 | 2/2007 |
| TW | 201139991 | 11/2011 |
| WO | WO-03/098953 | 11/2003 |
| WO | WO-2010/027179 | 3/2010 |

OTHER PUBLICATIONS

PCT/US2011/066834, PCT Notification of Transmittal of International Search Report and the Written Opinion of the International Searching Authority, or the Declaration, Mailed Sep. 14, 2012, 9 pages.

Japanese Patent Application No. 2014-548769 English Translation of Notice of Reasons for Rejection from Japan Patent Office, Mailed Mar. 24, 2015, 4 pages.

Office Action from Counterpart EP Patent Application No. 11877948.7, Mailed Jun. 22, 2015, 8 pages.

Chinese Patent Application No. 201180075814.6 Search Report, issued Jul. 24, 2015, 2 pages.

* cited by examiner

MECHANISM FOR EMPLOYING AND FACILITATING GEODETIC TRIANGULATION FOR DETERMINING GLOBAL POSITIONING OF COMPUTING DEVICES

CROSS-REFERENCE TO RELATED APPLICATION

This patent application is a U.S. National Phase Application under 35 U.S.C. §371 of International Application No. PCT/US2011/066834, filed Dec. 22, 2011, entitled MECHANISM FOR EMPLOYING AND FACILITATING GEODETIC TRIANGULATION FOR DETERMINING GLOBAL POSITIONING OF COMPUTING DEVICES.

FIELD

The field relates generally to computing devices and, more particularly, to employing a mechanism for employing and facilitating geodetic triangulation for determining global positioning of computing devices.

BACKGROUND

Currently, there is no standard way for computing devices in closed areas without a clear view of the sky (such as indoors or in urban canyons, etc.) to be able to determine their global position. Global Positioning System (GPS)-based devices (e.g., navigation systems, etc.) work outdoors when satellites are in view, but they do not work well when indoors and/or not in clear view of the satellite.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for facilitating dynamic client-side geodetic triangulation to determine global position of computing devices according to one embodiment of the invention. A method of embodiments of the invention includes detecting, at a computing device, first location information associated with static wireless access points. The method may further include detecting, at the computing device, second location information associated with roaming computing devices broadcasting the second location information relating to their current locations, and dynamically determining a current location of the computing device based on the first and second location information.

In one embodiment, a client-side solution is provided to enable client computing devices to triangulate and locate their positions when not in clear view of the sky or satellites (such as when indoors, in urban canyons, at ballparks, etc.) using GPS data acquired from a Wi-Fi infrastructure and/or nearby Wi-Fi-enabled devices. In one embodiment, the aforementioned solution includes a novel creation of a specific geodetic update that can contain key information that client devices can use to interpret their locations in a novel manner. For example, a geodetic update can provide updates regarding a client device's real position or location on earth, such as using geodetic coordinates that can approximate the earth's surface by an ellipsoid and any locations near the surface are described in terms of latitude, longitude, height, etc. Further, the novel solution provides a peer-to-peer participation in a geo cloud that can provide additional accuracy in promoting the novel client-side triangulation.

An embodiment of the invention outlines directly how a client computing system can triangulate its exact position both peer-to-peer (such as with a roaming client computing device, such as a smartphone, etc.) and/or using static location devices (such as a wireless access point or a computing device found in a stationary position for any defined period of time, etc.) without having the need for directly connecting with the Wi-Fi infrastructure. In some embodiments, the Wi-Fi access may not be needed at all other than for being able to see a geo-ping request and reply to it. In one embodiment, a Wi-Fi infrastructure and any client computing devices are allowed to provide global positioning data and participate in sharing their global positioning without having to authenticate their Wi-Fi connections. This technique can be performed even without a Wi-Fi infrastructure, such as by merely having a beacon reply system that uses Wi-Fi frequency.

Figure 1:
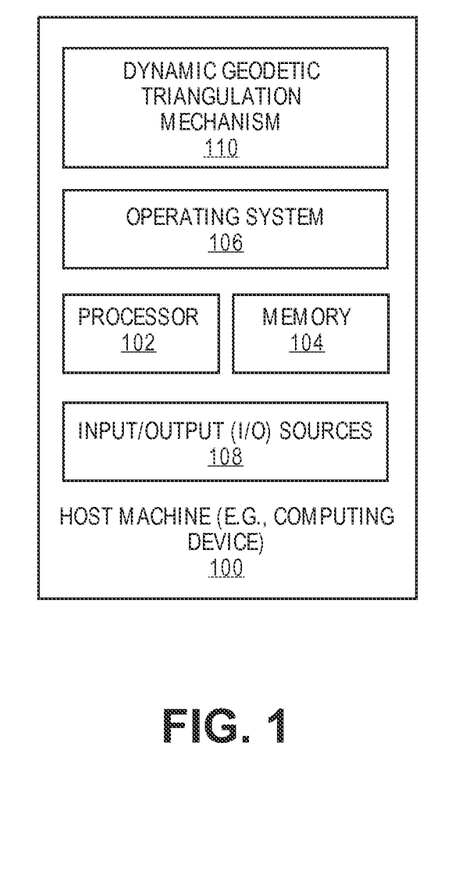
FIG. 1 illustrates a computing device employing a dynamic geodetic triangulation mechanism according to one embodiment of the invention.

FIG. 1 illustrates a computing device employing a dynamic geodetic triangulation mechanism according to one embodiment of the invention. In one embodiment, a host machine (e.g., computing device) 100 is illustrated as having a dynamic geodetic triangulation mechanism ("triangulation mechanism") 110 to facilitate dynamic and automatic determination of global positioning of computing devices. Computing device 100 may include mobile computing devices, such as cellular phones including smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers (e.g., notebooks, netbooks, etc.), e-readers (e.g., Kindle®, Nook®, etc.), GPS-navigation systems, etc. Computing device 100 may further include set-top boxes (e.g., Internet-based cable television set-top boxes, etc.), and larger computing devices, such as desktop computers, server computers, cluster-based computers, etc.

Computing device 100 includes an operating system 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "memory client", "host", "server", "memory server", "machine", "device", "computing device", "computer", "computing system", "cluster based computer", and the like, are used interchangeably and synonymously throughout this document.

Figure 2:
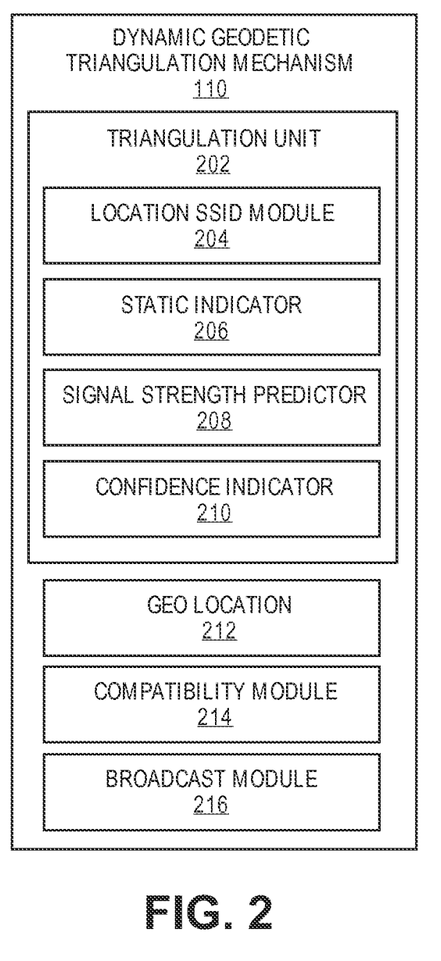
FIG. 2 illustrates a dynamic geodetic triangulation mechanism according to one embodiment of the invention.

FIG. 2 illustrates a dynamic geodetic triangulation mechanism according to one embodiment of the invention. In the illustrated embodiment, the triangulation mechanism 110 includes various components 202, 204, 206, 208, 210, 212, 214, and 216 to facilitate dynamic and automatic determination of geographic locations or positions of computing devices. In one embodiment, a triangulation unit 202 of the triangulation mechanism 110 facilitates the client-side triangulation resulting in an automatic, dynamic and efficient determination of geo-positioning of a computing device. The triangulation unit 202 includes a location service set identifier (SSID) module 204 to utilize a methodology for a global standard to allow computing devices to access location information without requiring a computing device to connect to an infrastructure (e.g., Wi-Fi infrastructure). In one embodiment, the location SSID module 204 standardizes an SSID name and security design such that the location SSID module 204 does not have to require computing devices to associate with a Wi-Fi infrastructure, but instead, allow them to receive, listen to, and participate in simple broadcasts made by participating computing device and/or the Wi-Fi infrastructure. An SSID may be used to identify a particular 802.11 wireless Local Area Network (LAN); for example, a client device may receive beacon messages from all access points (APs), within a defined range, advertising their SSIDs. This client device can then either manually or automatically, based on the configuration, select a wireless network with which to associate. The location SSID module 204 provides a methodology or standardization of a specific SSID to enable peer-to-peer location sharing network.

The triangulation unit 202 further includes a static indicator 206 to provide a process for differentiating between roaming computing devices and those devices that have a static configured location (e.g., access points or fixed/stationary computing devices). This novel technique is used to help participating computing devices increase their accuracy estimations. Further, it allows those devices that are trying to figure out their location (e.g., where am I?) to have the ability to tell or broadcast, via a broadcast module 216, other computing devices and access points how close they are to a static geodetic location. The broadcast module 216 may be used for any number of broadcasting purposes, such as a computing device advertising or publishing its confidence level, etc. Once these "lost" devices have figured out their proximity to one or more static geodetic locations, they can then use roaming computing devices to help increase their accuracy. In other words, the static indicator 206 is used to signify if the location of a computing device that is being advertised is statically configured or whether the computing device has dynamically determined its own location. The static indicator 206 provides a methodology for determining the difference between a peer computing device that has "learned" its location and an infrastructure-based computing device having a statically-programmed location.

The triangulation unit's 202 signal strength predictor 208 provides a methodology for identifying and using signal strength to help determine distances, such as using the signal strength predictor 208 to predict (the expected) signal strength being emitted from a computing device. Without knowing the power output of a computing device (like a black box), the signal strength is difficult to expect, which can make distance measurement difficult, inaccurate, and unpredictable. However, in one embodiment, by embedding signal strength information in the signal strength predictor 208, each computing device that can listen to a signal can use this signal strength information to better predict its distance using long-distance sound devices that are known for accurate signal predictions, such as a Freespace® model. Further, for example, a hexadecimal number may be used to advertise the transmit power and antenna gain of a beaconing computing device. This technique allows the receiving node to better know or calculate certain indicators and power associated with a signal, such as a Received Signal Strength Indication (RSSI) that represents a measurement of power present in received radio signal.

A confidence indicator 210 of the triangulation unit 202 may refer to a confidence factor that can be used in a novel manner such as using a client computing device's learned location in a peer-to-peer sharing session. Each client computing device can then advertise its confidence in the location to allow other computing devices (including other client computing devices) within the network to hear this and use that number in a weighted way to add confidence to its own learned location and allow the same to the other computing devices. Using this technique, a novel peer-to-peer solution is introduced that uses the available information to increase accuracy even when a 100% confidence is unlikely to be obtained in a specific location update and thus, in this case, the weight is lowered to give that specific update. Further, a hexadecimal number is used to signify the confidence that a client device has in the location that it is advertising, while each number increase signifies, for example, a 0.1 meter variation in confidence the client device may have in its location.

In one embodiment, the triangulation mechanism 110 provides a geographic location 212, such as a longitude (e.g., 8 hex characters+1 byte), a latitude (e.g., 8 hex characters+1 byte), and like. The triangulation mechanism 110 further provides a compatibility module 214 that allows the triangulation mechanism 110 to be dynamically and automatically compatible with any type of computing devices (e.g., a Wi-Fi-enabled computing device, such as a personal computer, a tablet computer, a smartphone, a video game console, a digital audio player, GPS navigation systems, etc.), Wi-Fi or hotspot providers (e.g., telecommunication companies, Internet service providers, etc.), currently known and future standards (e.g., Institute of Electrical and Electronics Engineers (IEEE) 802.11, etc.) for implementing WLANs, and the like, so that the triangulation mechanism 110 can efficiently perform is functions as described throughout this document.

It is contemplated that any number and type of components may be added to and removed from the dynamic geodetic triangulation mechanism 110 to facilitate dynamic and automatic client-side triangulation for detecting geographic locations or positions of and for computing devices. For brevity, clarity, ease of understanding and to stay focused on the triangulation mechanism 110, many of the standard or known components, such as those of a computing device, are not shown or discussed here. It is contemplated that embodiments of the invention are not limited to any particular technology or standard and is dynamic enough to adopt and adapt to the changing technologies and standards.

Figure 3A:
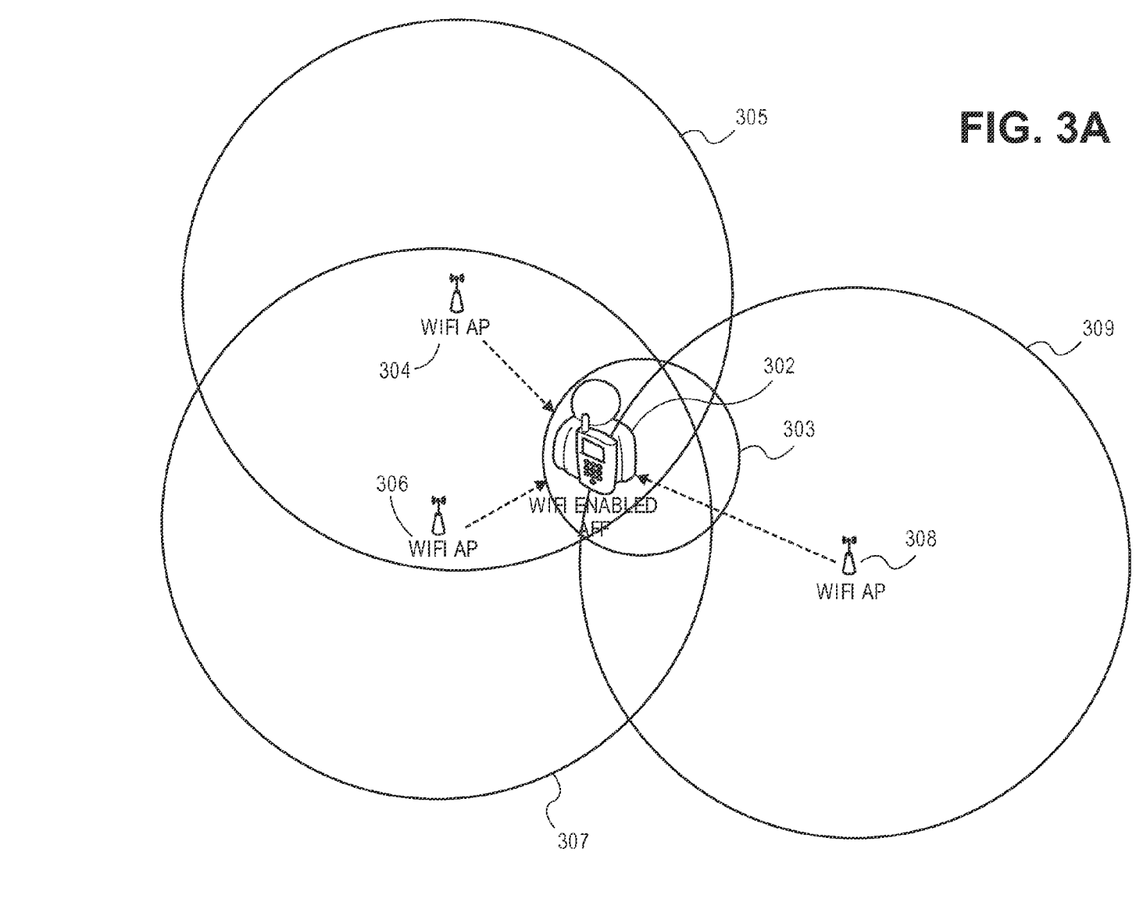
FIGS. 3A-3C illustrate a transaction sequence to facilitate client-based triangulation using a dynamic geodetic triangulation mechanism according to one embodiment of the invention.
Figure 3B:
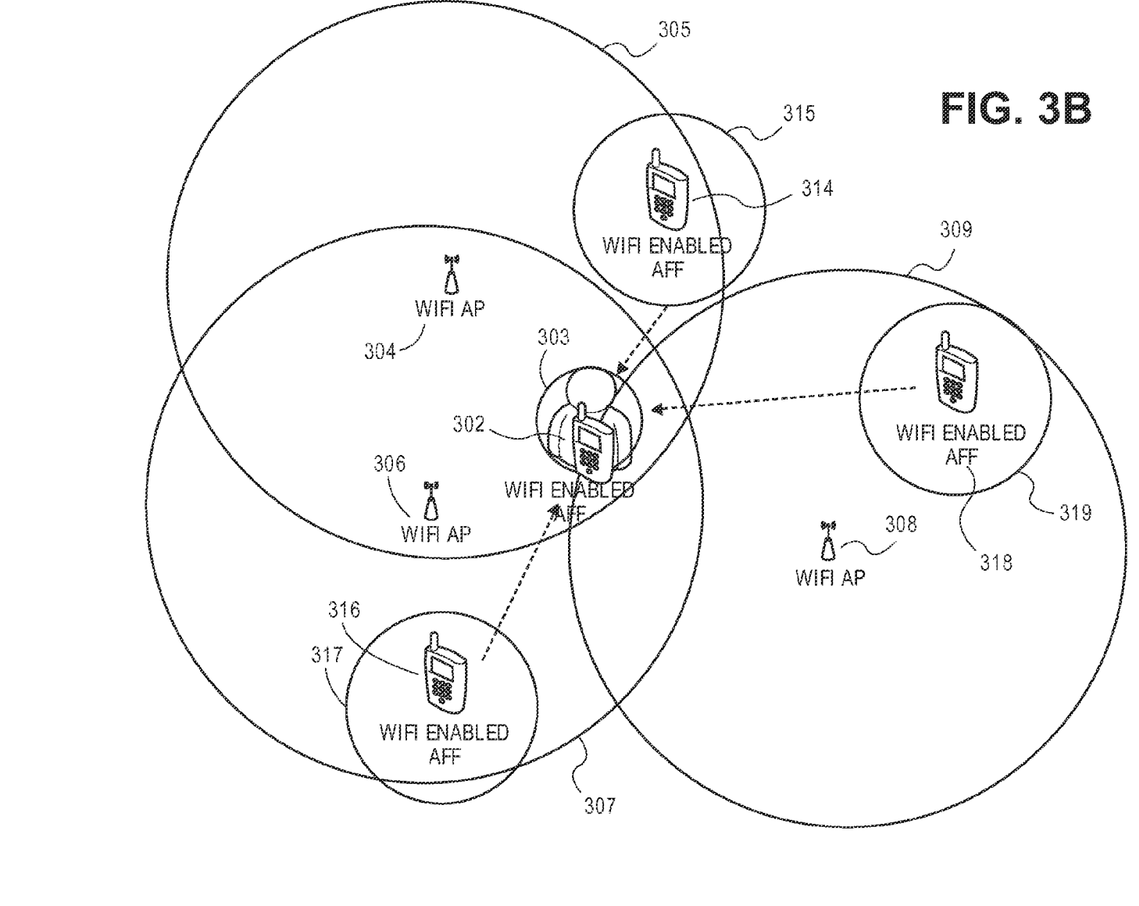
Figure 3C:
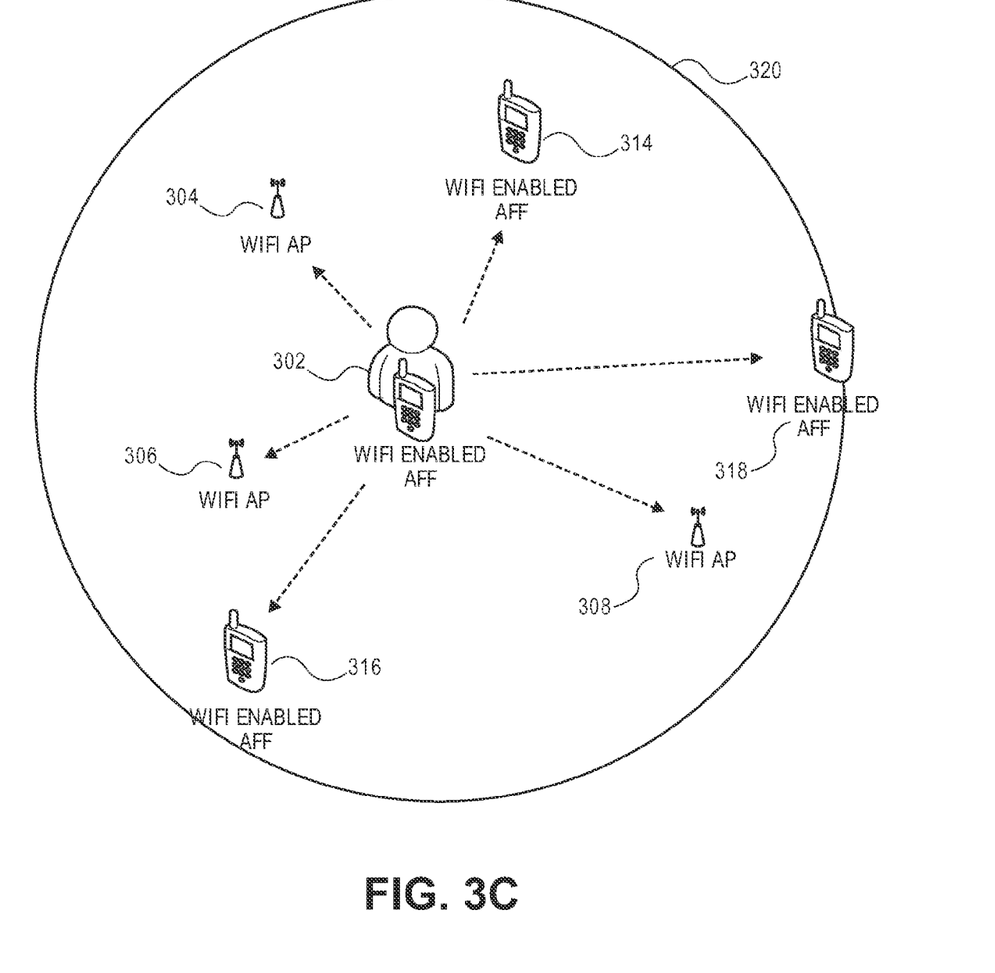

FIGS. 3A-3C illustrate a transaction sequence to facilitate client-based triangulation using a dynamic geodetic triangulation mechanism according to one embodiment of the invention. Referring to FIG. 3A, a Wi-Fi-enabled client computing device 302 seeks to locate itself (e.g., a roaming computing device (e.g., a smartphone belonging to a user) to find its own geographic location and/or a destination, such as a coffee shop, etc.) by recognizing and/or connecting with any available locations that are of highest confidences, such as any number of available Wi-Fi access points 304, 306, 308 of highest confidence within a defined area or range of the computing device 302. For example and as illustrated, each circle 305, 307 and 309 represents a wireless range of its corresponding Wi-Fi access point 304, 306 and 308, respectively. Similarly, circle 303 represents the range or access of the client device 302 which is shown as overlapping (or in contact) with other circles 305, 307, 309.

Let us now suppose the client device 302 belongs to an individual user seeking to find a shoe shop in a mall. In one embodiment, as soon as the client device 302 approaches the mall area, it is first put in contact with one or more of those AP locations 304, 306, 308 (as represented by their corresponding circles 305, 307, 309) that carry the highest weight, such as Wi-Fi APs 304, 306, 308 at places like in the mall, at a nearby Starbucks®, airport, etc. In other words, AP locations 304, 306, 308 having the highest confidence take high priority and thus are used first as the highest weight in this client-side triangulation (over other low confidence locations, such as other roaming client devices, etc., as will be further described with reference to FIG. 3B). In one embodiment, one of the high-weight or static AP 304, 306, 308 may include a beacon from a client device similar to the client device 302 belong to a user being stationary at the same location (e.g., sitting at a bench in the mall) for a defined period of time as predefined by the triangulation mechanism 110 of FIG. 1 and/or any of the participants, such as by the user of the computing device 302 who then feeds the time period information into the triangulation mechanism 110 via the computing device 302.

Referring now to FIG. 3B, once the high-weight APs 304, 306, 308 have been identified and put in touch with the client device 302, low-weight locations 314, 316 and 318 (e.g., roaming client computing devices) are then identified and put in contact with the client device 302 as represented by their corresponding area or signal or access circles 315, 317 and 319, respectively, that are shown as overlapping with other circles 305, 307 and 309. For example and in one embodiment, these low-weight locations 314, 316, 318 include Wi-Fi-enabled roaming client computing devices that belong to other users who are within the predefined area around the computing device 302, such as near or in the mall. For example, the users of these Wi-Fi-enabled computing devices 314, 316, 318 may include other shoppers seeking to find or currently at the same shoe store as the user of the client device 302 or seeking to find or current at another place (e.g., a coffee shop) near the shoe store, which helps with and results in a better knowledge of the geographic positioning of the client device 302. In other words, first, the high-weight, low-confidence locations associated with static APs 304, 306, 308 are put in proximity and connection with the client device 302, which is then followed by putting the low(er)-weigh, low(er)-confidence computing devices 314, 316, 318 (that beacon out their locations) in proximity with the client device 302 to improve the accuracy and confidence of the client device's 302 geographic location (such as with reference to its destination, such as the mall shoe store).

In one embodiment, these low-weight locations of Wi-Fi enabled roaming computing devices 314, 316, 318 and may be determined based on the low confidence beacons (such as locations or location-related updates (e.g., one or more users of the client devices 314, 316, 318 updating their profile on Facebook® that they are at a coffee shop at the mall, etc.) that are received from these client devices 314, 316, 318. This novel client-side triangulation technique helps the client device 302 (and thus the user of the client device 302) determine its exact location in relation to the shoe store without having the user to access the Internet on the client device 302 (such as to access websites like Yelp®, Where®, etc.) which may not be possible due to bad reception, such as the client device 302 being indoors and/or not having a clear view of the sky (and thus, the satellites).

In one embodiment, the location SSID module 204 of the triangulation mechanism 110 of FIG. 2 communicates the access location information between the client device 302 and the APs 304, 306, 308 and other roaming client devices 314, 316, 318 without having the client device 302 (and other participating client devices 314, 316, 318) connect with a Wi-Fi infrastructure. It is the static indicator 206 of FIG. 2 that differentiates between the high-weight static configured locations 304, 306, 308 and the low-weight roaming locations 314, 316, 318. Similarly, the signal strength predictor 208 facilitates the client device 302, the static APs 304, 306, 308, and the roaming client devices 314, 316, 318 to predict their signal strength, while the confidence indicator 210 facilitates the client device 302, the static APs 304, 306, 308, and the roaming devices 314, 316, 318 to broadcast or advertise their confidence level relating to their own location which is then received by the computing devices 302, 314, 316, 318 (and the static configured APs 304, 306, 308) and used to assign (e.g., adjust or re-adjust) weight to each confidence level (e.g., high weight, low weight, medium weight, etc.). These weighted confidence levels are used to add confidence to each AP or client device's current learned location (e.g., the client device's 302 current location with respect to its desired destination of the mall shoe shop, etc.)

FIG. 3C illustrates the client device 302 beacons out its position to others, such as to the high-weight APs 304, 306, 308, low-weight client devices 314, 316, 318, etc., so that each participating AP 304, 306, 308 and client device 314, 316, 318 can calibrate its own location using the information being beaconed out by the client device's 302. This beaconing out by the client device 302 and the collective confidence in learned positions of the participating APs 304, 306, 308 and client devices 314, 316, 318 is represented by the illustrated circle 320. Stated differently, once the client device 302 has determined its location (as aforementioned with reference to FIGS. 3A and 3B), it then broadcasts its own location to APs 304, 306, 308 and client devices 314, 316, 318 so they may benefit from this information and gain confidence in their own positions, particularly the client devices 314, 316, 318 that are on the move.

Figure 4:
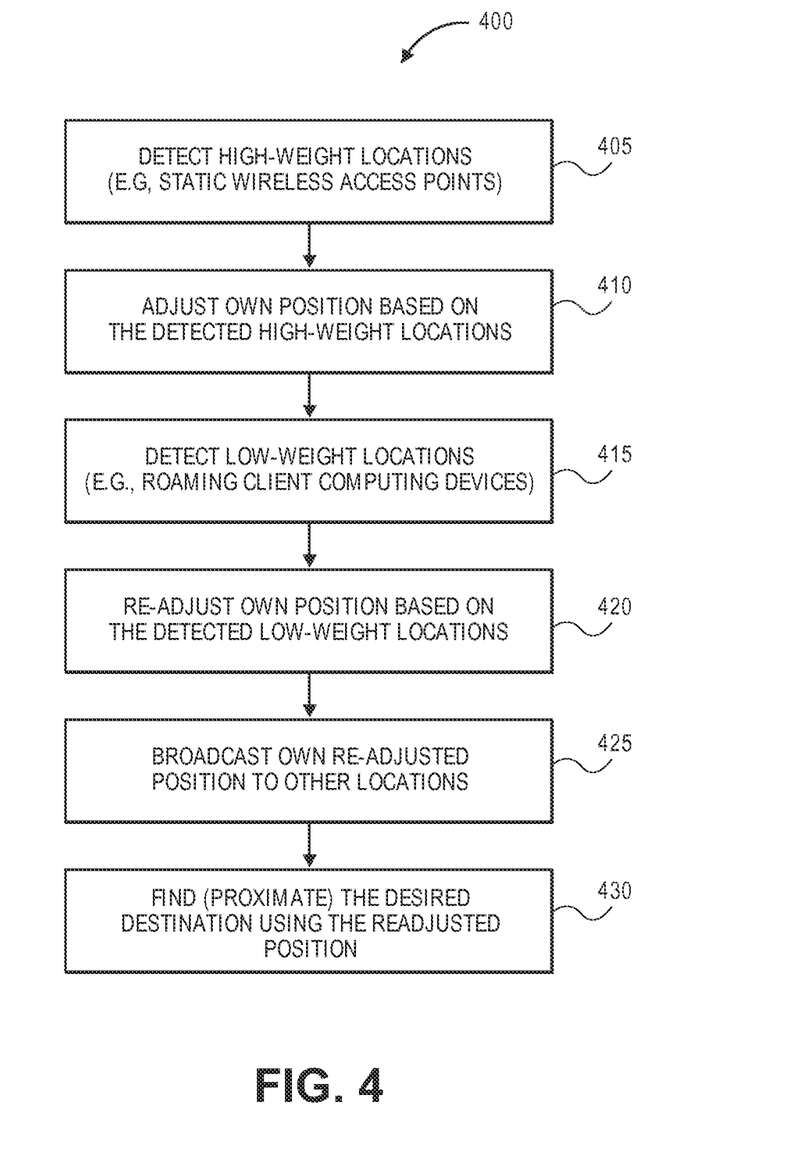
FIG. 4 illustrates a method for performing dynamic client-side geodetic triangulation for determining global positioning of computing device according to one embodiment of the invention.

FIG. 4 illustrates a method for performing dynamic client-side geodetic triangulation for determining global positioning of computing device according to one embodiment of the invention. Method 400 may be performed by processing logic that may comprise hardware (e.g., circuitry, dedicated logic, programmable logic, etc.), software (such as instructions run on a processing device), or a combination thereof. In one embodiment, method 400 may be performed by the dynamic geodetic triangulation mechanism 110 of FIG. 1.

Method 400 starts with block 405 with a client computing device (e.g., a mobile computing device, such as a smartphone, a tablet computer, etc.) seeking a desired location (such as the user of the client computing device needing to know his or her exact position or current geographic location) or a destination (such as the user seeking to find a house, a store, a ballpark, a street, etc.) detects one or more high-weight locations (e.g., static wireless access points, etc.). At block 410, the client computing device, upon detecting the high-weight locations, adjusts its position based on the location and/or other relevant information (e.g., confidence level, updates, etc.) relating to and received from the high-weight locations.

At block 415, the client computing device detects one or more low-weight locations (e.g., other participating roaming client devices broadcasting their locations and/or beaconing out location-related updates (e.g., at the Starbucks at the corner of Main Street and First Avenue, etc.) that can be used to determine their locations, etc. At block 420, the client computing device, upon detecting the low-weight locations, re-adjusts its own physical location based on these location and/or other relevant information (e.g., confidence level, location-related updates, etc.). At block 425, upon re-adjusting its own location, the client computing device broadcasts its own location so that others (e.g., high-weight APs, and low-weight computing devices, etc.) can benefit from that information and adjust, configure or calibrate their own locations. At block 430, the client computing device finds or reaches the aforementioned desired location or destination based on its own re-adjusted position.

Figure 5:
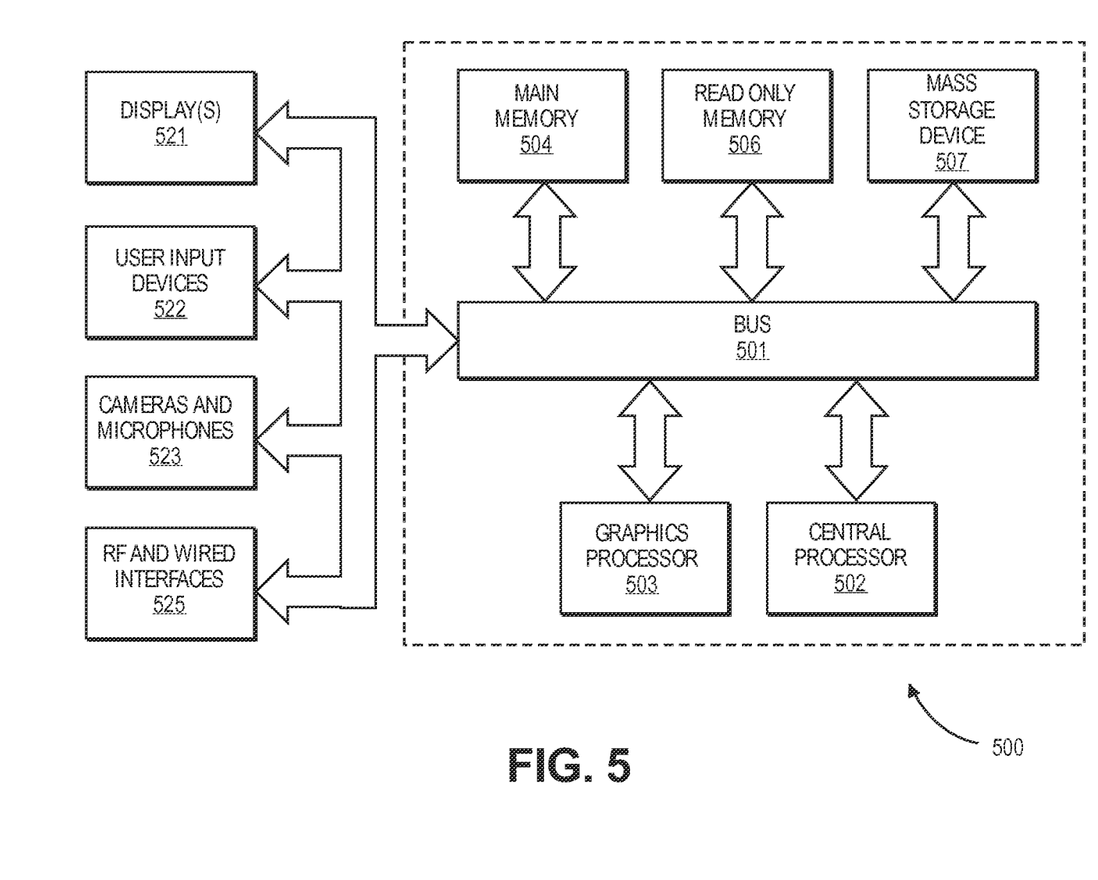
FIG. 5 illustrates a computing system according to one embodiment of the invention.

FIG. 5 illustrates a computing system 500 employing and facilitating a dynamic geodetic triangulation mechanism according to one embodiment of the invention. The exemplary computing system 500 may be the same as or similar to the computing device 100 FIG. 1 and any of the other computing devices discussed throughout this document, such as with reference to FIGS. 3A-3C. The computer system 500 includes a bus or a link or an interconnect (hereinafter referred to as "bus") other communication means 501 for communicating information, and processing means such as a microprocessor 502 coupled with the bus 501 for processing information. The computer system 500 may be augmented with a graphics processor 503 for rendering graphics through parallel pipelines and may be incorporated into one or more central processor(s) 502 or provided as one or more separate processors.

The computer system 500 further includes a main memory 504, such as a RAM or other dynamic data storage device, coupled to the bus 501 for storing information and instructions to be executed by the processor 502. The main memory also may be used for storing temporary variables or other intermediate information during execution of instructions by the processor. The computer system 500 may also include a nonvolatile memory 506, such as a Read-Only Memory (ROM) or other static data storage device coupled to the bus 501 for storing static information and instructions for the processor.

A mass memory 507 such as a magnetic disk, optical disc, or solid state array and its corresponding drive may also be coupled to the bus 501 of the computer system 500 for storing information and instructions. The computer system 500 can also be coupled via the bus to a display device or monitor 521, such as a Liquid Crystal Display (LCD) or Organic Light Emitting Diode (OLED) array, for displaying information to a user. For example, graphical and textual indications of installation status, operations status and other information may be presented to the user on the display device 521, in addition to the various views and user interactions discussed above.

Typically, user input devices 522, such as a keyboard with alphanumeric, function and other keys, etc., may be coupled to the bus 501 for communicating information and command selections to the processor 502. Additional user input devices 522 may include a cursor control input device such as a mouse, a trackball, a trackpad, or cursor direction keys can be coupled to the bus for communicating direction information and command selections to the processor 502 and to control cursor movement on the display 521.

Camera and microphone arrays 523 may be coupled to the bus 501 to observe gestures, record audio and video and to receive visual and audio commands as mentioned above.

Communications interfaces 525 are also coupled to the bus 501. The communication interfaces may include a modem, a network interface card, or other well-known interface devices, such as those used for coupling to Ethernet, token ring, or other types of physical wired or wireless attachments for purposes of providing a communication link to support a LAN or Wide Area Network (WAN), for example. In this manner, the computer system 500 may also be coupled to a number of peripheral devices, other clients, or control surfaces or consoles, or servers via a conventional network infrastructure, including an Intranet or the Internet, for example. Examples of a network include, but are not limited to, a LAN, a WAN, a Metropolitan Area Network (MAN), a Personal Area Network (PAN), an intranet, the Internet, and the like.

Embodiments may be implemented as any or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware, such as firmware.

Embodiments may be provided, for example, as a computer program product which may include one or more machine-readable media, such as a non-transitory machine-readable medium, having stored thereon machine-executable instructions that, when executed by one or more machines such as a computer, such as computing system 500, network of computers, or other electronic devices, may result in the one or more machines carrying out operations in accordance with embodiments of the present invention. A machine-readable medium may include, but is not limited to, floppy diskettes, optical disks, Compact Disc-ROMs (CD-ROMs), and magneto-optical disks, ROMs, RAMs, Erasable Programmable Read-Only Memories (EPROMs), EEPROMs Electrically Erasable Programmable Read-Only Memories (EEPROMs), magnetic or optical cards, flash memory, or other type of media/machine-readable medium suitable for storing machine-executable instructions, such as solid state storage devices, fast and reliable DRAM sub-systems, etc.

Program code, or instructions, may be stored in, for example, volatile and/or non-volatile memory, such as storage devices and/or an associated machine-readable or machine-accessible or machine-executable medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, smartphones, tablet computers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. Embodiments of the invention are not limited by these specific examples. Numerous variations, whether explicitly given in the specification or not, such as differences in structure, dimension, and use of material, are possible. Embodiments may be at least as broad as given by the following claims.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto consistent with the description herein. The Specification and drawings are, accordingly, to be regarded in an illustrative rather than a restrictive sense.

What is claimed is:

1. An apparatus comprising:
    a processor running on an operating system, the operating system communicatively coupled to a dynamic geodetic triangulation logic unit to perform geodetic triangulation, wherein the dynamic geodetic triangulation logic unit ("triangulation unit") to:
    detect, at the apparatus, first location information associated with static wireless access points, and second location information associated with roaming computing devices broadcasting the second location information relating to their current locations;
    dynamically determine a current location of the apparatus based on the first and second location information; and
    adjust the current location of the apparatus based on the first location information and the second location information, wherein the triangulation unit is further to adjust high weight associated with the first location information and low weight associated with the second location information based on changing confidence levels relating to the wireless access points and the roaming computing devices, respectively.

2. The apparatus of claim 1, wherein the triangulation unit is further to broadcast the current location of the apparatus to one or more computing devices associated with the static wireless access points and the roaming computing devices.

3. The apparatus of claim 1, wherein the triangulation unit is further to detect the high weight associated with the first location information and the low weight associated with the second location information.

4. The apparatus of claim 1, wherein the triangulation unit is further to perform a client-based triangulation.

5. A system comprising:
    a computing device having a memory to store instructions, and a processing device to execute the instructions, wherein the instructions cause the processing device to:
    detect first location information associated with static wireless access points, wherein the processing device is further to detect second location information associated with roaming computing devices broadcasting the second location information relating to their current locations;
    dynamically determine a current location of the computing device based on the first and second location information; and
    adjust the current location of the computing device based on the first location information and the second location information, wherein the triangulation unit is further to adjust high weight associated with the first location information and low weight associated with the second location information based on changing confidence levels relating to the wireless access points and the roaming computing devices, respectively.

6. The system of claim 5, wherein the processing device is further to broadcast the current location of the computing device to one or more computing devices associated with the static wireless access points and the roaming computing devices.

7. The system of claim 5, wherein the processing device is further to detect the high weight associated with the first location information and the low weight associated with the second location information.

8. A method comprising:
  detecting, at a computing device, first location information associated with static wireless access points;
  detecting, at the computing device, second location information associated with roaming computing devices broadcasting the second location information relating to their current locations;
  dynamically determining a current location of the computing device based on the first and second location information; and
  adjusting the current location of the computing device based on the first location information and the second location information, wherein the triangulation unit is further to adjust high weight associated with the first location information and low weight associated with the second location information based on changing confidence levels relating to the wireless access points and the roaming computing devices, respectively.

9. The method of claim 8, further comprising broadcasting the current location of the computing device to one or more computing devices associated with the static wireless access points and the roaming computing devices.

10. The method of claim 8, further comprising detecting the high weight associated with the first location information and the low weight associated with the second location information.

11. At least one computer-readable medium having instructions stored thereon which, if executed by a computing device, cause the computing device to:
  detect first location information associated with static wireless access points;
  detect second location information associated with roaming computing devices broadcasting the second location information relating to their current locations;
  dynamically determine a current location of the computing device based on the first and second location information; and
  adjust the current location of the computing device based on the first location information and the second location information, wherein the triangulation unit is further to adjust high weight associated with the first location information and low weight associated with the second location information based on changing confidence levels relating to the wireless access points and the roaming computing devices, respectively.

12. The at least one computer-readable medium of claim 11, wherein the instructions when executed, further cause the computing device to, broadcast the current location of the computing device to one or more computing devices associated with the static wireless access points and the roaming computing devices.

13. The at least one computer-readable medium of claim 11, wherein the instructions when executed, further cause the computing device to, detect the high weight associated with the first location information and the low weight associated with the second location information.

* * * * *